(12) United States Patent
Jo et al.

(10) Patent No.: US 12,325,763 B2
(45) Date of Patent: Jun. 10, 2025

(54) CATALYST COMPOSITION AND METHOD FOR PREPARING POLYISOBUTENE USING THE SAME

(71) Applicant: LG Chem, Ltd., Seoul (KR)

(72) Inventors: Dong Hyun Jo, Daejeon (KR); Seong Beom Heo, Daejeon (KR); Won Hee Kim, Daejeon (KR); Jin Lee, Daejeon (KR); Gyeong Shin Choi, Daejeon (KR); Hee Jeong Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 681 days.

(21) Appl. No.: 17/605,373

(22) PCT Filed: Dec. 4, 2020

(86) PCT No.: PCT/KR2020/017634
§ 371 (c)(1),
(2) Date: Oct. 21, 2021

(87) PCT Pub. No.: WO2021/112617
PCT Pub. Date: Jun. 10, 2021

(65) Prior Publication Data
US 2022/0195079 A1  Jun. 23, 2022

(30) Foreign Application Priority Data

Dec. 6, 2019   (KR) .................. 10-2019-0162054
Dec. 6, 2019   (KR) .................. 10-2019-0162055

(51) Int. Cl.
*C08F 10/10*  (2006.01)
*C07F 5/02*   (2006.01)

(52) U.S. Cl.
CPC ............ *C08F 10/10* (2013.01); *C07F 5/027* (2013.01)

(58) Field of Classification Search
CPC ....................... C08F 10/10; C07F 5/02
See application file for complete search history.

(56) References Cited

U.S. PATENT DOCUMENTS

| | | | |
|---|---|---|---|
| 10,047,174 B1 | 8/2018 | Dimitrov et al. | |
| 11,718,632 B2* | 8/2023 | Kim .................. | C08F 4/52 526/183 |
| 11,987,651 B2* | 5/2024 | Choi ................. | C08F 112/12 |
| 2003/0088135 A1 | 5/2003 | Yun et al. | |
| 2003/0176606 A1 | 9/2003 | Bohnenpoll et al. | |
| 2004/0015029 A1 | 1/2004 | Lange et al. | |
| 2006/0173227 A1 | 8/2006 | Bohnenpoll et al. | |
| 2006/0195000 A1 | 8/2006 | Yun et al. | |
| 2007/0155930 A1 | 7/2007 | Rath et al. | |
| 2008/0249267 A1 | 10/2008 | Hanefeld et al. | |
| 2008/0249268 A1 | 10/2008 | Rath et al. | |
| 2008/0293900 A1 | 11/2008 | Hanefeld et al. | |
| 2020/0247924 A1 | 8/2020 | Choi et al. | |
| 2020/0291148 A1 | 9/2020 | Choi et al. | |
| 2020/0308323 A1 | 10/2020 | Choi et al. | |
| 2022/0127393 A1 | 4/2022 | Choi et al. | |
| 2022/0195079 A1* | 6/2022 | Jo ..................... | C07F 5/027 |
| 2022/0204533 A1* | 6/2022 | Choi .................. | B01J 31/146 |

FOREIGN PATENT DOCUMENTS

| | | | |
|---|---|---|---|
| CN | 113490692 A | 10/2021 | |
| EP | 3913004 A1 | 11/2021 | |
| JP | 2003277428 A | 10/2003 | |
| JP | 2004525197 A | 8/2004 | |
| JP | 2005008719 A | 1/2005 | |
| JP | 2021503536 A | 2/2021 | |
| JP | 2021504528 A | 2/2021 | |
| JP | 2022519216 A | 3/2022 | |
| KR | 100486044 B1 | 4/2005 | |
| KR | 20080078654 A | 8/2008 | |
| KR | 101145030 B1 | 5/2012 | |
| KR | 20170084181 A | 7/2017 | |
| KR | 20190110759 A | 10/2019 | |
| KR | 20190110957 A | 10/2019 | |
| KR | 20190116944 A | 10/2019 | |
| KR | 10-2021-0071659 A * | 6/2021 | C08F 10/10 |
| KR | 102506502 B1 | 3/2023 | |
| WO | 2016077303 A1 | 5/2016 | |

OTHER PUBLICATIONS

Jutzi, P. et al., Synthesis, Crystal Structure, and Application of the Oxonium Acid [H(OEt2)2]+[B(C6F5)4]-, Organometallics, 2000, vol. 19. (2000). pp. 1442-1444.

(Continued)

*Primary Examiner* — Rip A Lee

(74) *Attorney, Agent, or Firm* — Lerner David LLP

(57) ABSTRACT

The present invention relates to a catalyst composition including an oxonium ion-based catalyst represented by the following Formula 1, and an additive, and a method for preparing polyisobutene using the same:

[Formula 1]

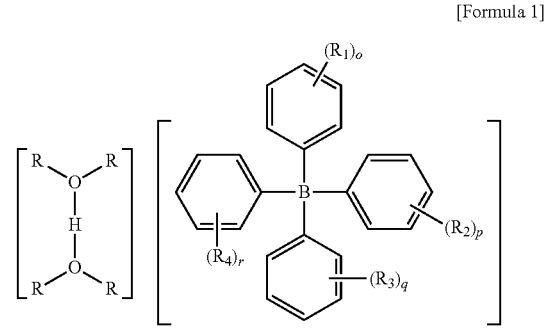

wherein R, $R_1$ to $R_4$, and o, p, q and r are described herein.

16 Claims, No Drawings

(56) References Cited

OTHER PUBLICATIONS

Finze, M. et al., [H(OEt2)2]+ and [Ph3C]+ Salts of the Borate Anions [B(CF3)4]-, [(CF3)3BCN]-, and [B(CN)4]-, Organometallics, 2005, vol. 24, No. 21, (2005) pp. 5103-5109.
International Search Report for PCT/KR2020/017634 dated Mar. 12, 2021. 2 pgs.
Hijazi A. et al., Improved Synthesis, Characterization and Catalytic Application of [H(OEt2)2][B{C6H3(m-CF3)2}4], Journal of Organometallic Chemistry, doi: 10.1016/j.jorganchem.2014.04.023, (2014). pp. 1-11.
Miyake G. et al., Stereospecific Polymerization of Chiral Oxazolidinone-Functionalized Alkenes, Macromolecules, 2010, 43, (2010). pp. 7504-7514.
Search Report dated Sep. 25, 2022 from Office Action for Chinese Application No. 2020800312670 issued Oct. 9, 2022. 2 pgs.
Qiang Liu et al: "Polyisobutylene with High exo-Olefin Content via b-H Elimination in the Cationic Polymerization of Isobutylene with H2 O/FeCl 3 /Dialkyl Ether Initiating System", Macromolecules, vol. 44, No. 7, Mar. 11, 2011 (Mar. 11, 2011) , pp. 1866-1875, XP055023424.
Extended Search Report for Application No. 20896680.4 dated May 3, 2022. 13 pgs.

\* cited by examiner

CATALYST COMPOSITION AND METHOD FOR PREPARING POLYISOBUTENE USING THE SAME

CROSS-REFERENCE TO RELATED APPLICATIONS

The present application is a national stage entry under 35 U.S.C. § 371 of International Application No. PCT/KR2020/017634 filed Dec. 4, 2020, which claims priority from Korean Patent Application No. 10-2019-0162054, filed Dec. 6, 2019 and Korean Patent Application No. 10-2019-0162055, filed Dec. 6, 2019, the entire contents of which are incorporated herein by reference.

TECHNICAL FIELD

The present invention relates to a catalyst composition including an oxonium ion-based catalyst and a nitrile-based additive, and a method for preparing polyisobutene using the same.

BACKGROUND ART

Generally, in a process for preparing an oligomer or a polymer by the cationic polymerization of a monomer, a propagating polymer chain includes an active moiety which has a positive charge. For example, the active moiety may be a carbenium ion (carbocation) or an oxonium ion.

As a catalyst or an initiator for such cationic polymerization, an aluminum- or boron-based Lewis acid is generally used. Examples of the Lewis acid catalyst include $AlX_3$, $BX_3$ (X=F, Br, Cl, I), etc., and the Lewis acid is a corrosive substance and produces halogen components such as HCl and HF during a quenching process, and this halogen components remain in a product to cause problems of degrading product quality. In addition, a Lewis acid catalyst requires a large amount of catalyst, and in order to remove the catalyst after reaction, a large amount of base (NaOH, KOH, $NH_4OH$, etc.) is used, and accordingly, additional washing with water is required and a large amount of waste water is produced.

Meanwhile, examples of the monomer which is capable of undergoing cationic polymerization include styrene, isobutene, cyclopentadiene, dicyclopentadiene and the derivatives thereof, and typical examples include polyisobutene (PIB) obtained by polymerizing isobutene.

Polyisobutene is classified into a low molecular weight, medium molecular weight and high molecular weight range according to the range of molecular weight. The low molecular weight polyisobutene has a number average molecular weight in a range of about 10,000 or less, and is classified according to the content of carbon-carbon double bonds positioned at the terminal. There are conventional polyisobutene (PIB) having 20% or less of the terminal carbon-carbon double bond content and high reactive polybutene (HR-PB) product groups. After introducing a functional group using a vinylidene functional group at the terminal (>80%), the high reactive polybutene may be used as a fuel additive or an engine oil additive.

For the polymerization of the high reactive polybutene, a boron-based catalyst such as $BF_3$ has been used in the conventional technique, but this catalyst is toxic and has a gas type, and is difficult to handle. In addition, in order to increase reactivity and selectivity, a boron-alcohol or boron-ether composite is prepared and used, but there are problems in that the activity of the catalyst is reduced over time.

Meanwhile, according to a solvent-ligated organometal catalyst studied by Professor Kuhn of Technical University of Munich (Macromol. Rapid Commun., vol. 20, no. 10, pp. 555-559), problems relating to the deterioration of product quality and corrosiveness due to the toxic component such as a boron-based Lewis acid catalyst of the conventional technique may be solved, but since the reaction time is 16 hours and fundamentally long for attaining a high conversion ratio, structural isomerization is generated through the reaction of a portion of the product with the catalyst as time increases, and the exo-content decreases, and thus, the competitiveness is lower than the Lewis acid catalyst.

PRIOR ART DOCUMENT

Patent Document

Korean Registration Patent Publication No. 10-0486044

DISCLOSURE OF THE INVENTION

Technical Problem

An object of the present invention is to provide a catalyst composition for preparing polyisobutene having a desired number average molecular weight and showing high reactivity with the high exo-content.

Another object of the present invention is to provide a method for preparing polyisobutene using the catalyst composition.

Technical Solution

In order to solve the above-described tasks, the present invention provides a catalyst composition including: a catalyst represented by Formula 1 below; and a nitrile-based additive.

[Formula 1]

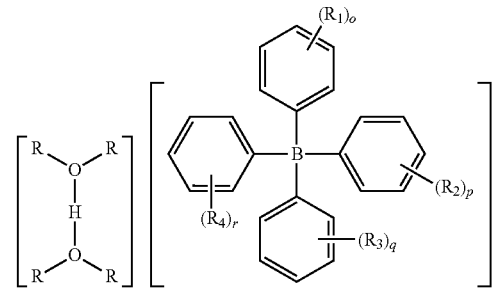

In Formula 1,

R is a linear C3 alkyl group, or a linear or branched C4-C12 alkyl group, $R_1$ to $R_4$ are each independently hydrogen, a halogen group or a substituted or unsubstituted alkyl group of 1 to 20 carbon atoms, and o, p, q and r are each independently an integer of 1 to 5.

Advantageous Effects

In case of using the catalyst composition of the present invention, polyisobutene having a high number average molecular weight, the exo-content of 80 mol % or more and excellent reactivity may be prepared.

Particularly, the preparation method of the present invention has advantages in preparing polyisobutene with an excellent polymerization conversion ratio even under moderate reaction conditions including room temperature, etc. by using the catalyst represented by Formula 1 having excellent catalyst activity and the nitrile-based compound as an additive.

In addition, the catalyst may be easily removed through a simple filtering step without direct washing the polyisobutene thus produced after finishing polymerization reaction, and problems of generating a large amount of waste water during washing and deteriorating product quality due to the remaining catalyst in the product may be solved.

BEST MODE FOR CARRYING OUT THE INVENTION

Hereinafter, the present invention will be described in more detail in order to assist the understanding of the present invention.

It will be understood that words or terms used in the description and claims of the present invention shall not be interpreted as the meaning defined in commonly used dictionaries. It will be further understood that the words or terms should be interpreted as having a meaning that is consistent with their meaning of the technical idea of the invention, based on the principle that an inventor may properly define the meaning of the words or terms to best explain the invention.

Catalyst Composition

The catalyst composition of the present invention is characterized in including: a catalyst represented by Formula 1 below; and a nitrile-based additive.

[Formula 1]

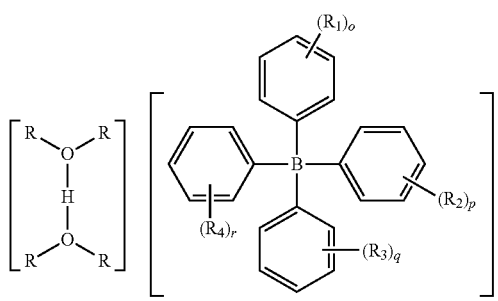

In Formula 1,

R is a linear C3 alkyl group, or a linear or branched C4-C12 alkyl group, $R_1$ to $R_4$ are each independently hydrogen, a halogen group or a substituted or unsubstituted alkyl group of 1 to 20 carbon atoms, and o, p, q and r are each independently an integer of 1 to 5.

In the present invention, in case of using the catalyst represented by Formula 1, the hydrogen atom between oxygen atoms reacts with isobutene, and an ether compound (R—O—R) is dissociated, and carbocation of isobutene is produced to initiate cationic polymerization. In this case, the hydrogen atom is positioned near the center of the catalyst in a sandwich shape, and alkyl groups (R) are present around the hydrogen atom, and accordingly, the approach of the isobutene thereto is not easy, and the initiation of polymerization may be difficult. Accordingly, for the easy reaction of the isobutene and the hydrogen atom and for the easy initiation of cationic polymerization, it is very important to suitably control the carbon number and steric size of R included in the catalyst represented by Formula 1.

Meanwhile, the dissociated ether compound (R—O—R) may be combined with the carbocation of a chain undergoing polymerization for stabilization. Particularly, the unshared electron pair of the oxygen included in the ether compound may be combined for a moment to stabilize the carbocation of the chain undergoing cationic polymerization, and in case of being dissociated from the carbocation via reverse reaction, polymerization with isobutene may be continued to prepare polyisobutene having a desired degree of high molecular weight. However, in case where the reactivity with very unstable carbocation is excessively high, intermolecular chain transfer or reaction termination may arise, and the control of the reactivity is difficult, thereby producing polyisobutene with a low molecular weight.

As described above, the alkyl group R in the catalyst represented by Formula 1 is required to be determined considering the degree of contribution to the stabilization through the coupling with the carbocation when dissociated into the ether compound.

In the present invention, it was found that R included in the catalyst represented by Formula 1 played an important role in preventing the synthesis of polyisobutene having a low molecular weight through the termination of polymerization reaction or chain transfer besides the contribution to the initiation step of cationic polymerization reaction, and a linear C3 alkyl group, and a C4-C12 alkyl group were used as R. In addition, though the catalyst represented by Formula 1 is not used according to the type of R, the nitrile-based compound is used as an additive for supplementation, and though the catalyst may be used for the polymerization of polyisobutene by itself according to the type of R, a high molecular weight and the exo-content may be secured with the use of the additive together.

In addition, since the catalyst represented by Formula 1 may be easily removed by a filtering method, which will be explained later, the risk of the dissociation of halogen from the catalyst may be effectively and fundamentally prevented.

In Formula 1, R is a linear C3 alkyl group, or a linear or branched C4-C12 alkyl group. Particularly, R may be a linear C3 alkyl group or a linear or branched C4-C8 alkyl group, preferably, an n-propyl group or a linear or branched butyl group.

In Formula 1, $R_1$ to $R_4$ may be each independently hydrogen, a halogen group or a halogen-substituted alkyl group of 1 to 20 carbon atoms, particularly, a halogen group, F or Cl. For example, $R_1$ to $R_4$ may be all F. In addition, o, p, q and r may be each independently an integer of 1 to 5, an integer of 3 to 5, particularly, 4 or 5. Most preferably, $R_1$ to $R_4$ may be F, and o, p, q and r may be 5.

In addition, organic borate

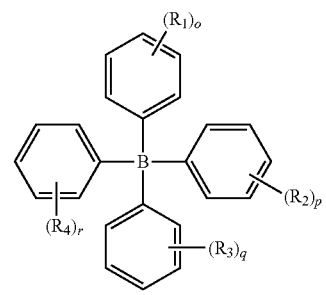

included in the compound represented by Formula 1 may particularly be one or more selected from the group consisting of tetrakis(phenyl)borate, tetrakis(pentafluorophenyl)borate, tetrakis[3,5-bis(trifluoromethyl)phenyl]borate, and the derivatives thereof, preferably, tetrakis(pentafluorophenyl)borate.

Particularly, the catalyst represented by Formula 1 may be a compound represented by Formula 1-1 or Formula 1-2 below, but is not limited thereto.

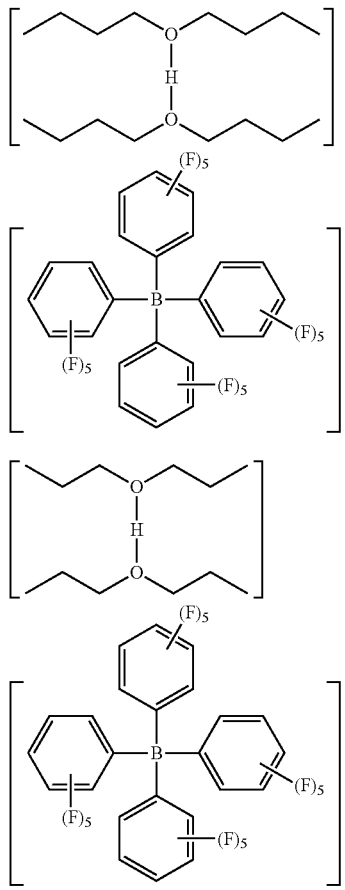

[Formula 1-1]

[Formula 1-2]

The catalyst composition of the present invention includes a nitrile-based additive together with the catalyst represented by Formula 1.

In the present invention, the unshared electron pair of nitrogen included in the nitrile-based additive has unstable properties and is liable to generate chemical change. Accordingly, the additive may be combined for a moment to stabilize the carbocation of a chain undergoing cationic polymerization, and dissociated from the carbocation via reverse reaction, and polymerization of the carbocation with isobutene may be promoted to prepare polyisobutene having a high molecular weight even under moderate reaction conditions.

If the nitrile-based additive is not used, there may be problems in that polyisobutene having a high molecular weight could not be prepared, and the numerical of the exo-content which is one of important physical properties of a product may become below standard.

However, if the additive is too strongly combined with the carbocation, the reverse reaction may become difficult, the reactivity of the carbocation itself may disappear, and the reaction may be finished. In this case, a polymer having a desired high molecular weight may not be obtained. In this regard, for example, an amine-based compound, an ether-based compound, a phosphine-based compound, etc., may be unsuitable as the additive, and the nitrile-based compound may preferably be used as in the present invention.

In the present invention, the nitrile-based additive may be a compound represented by Formula 2 below, but is not limited thereto.

$$R_5-CN$$ [Formula 2]

In Formula 2, $R_5$ may be an alkyl group of 1 to 20 carbon atoms or an aryl group of 6 to 30 carbon atoms, particularly, an alkyl group of 1 to 10 carbon atoms or an aryl group of 6 to 10 carbon atoms.

Particularly, the additive may include one or more selected from the group consisting of acetonitrile, propionitrile, 2-methylpropanenitrile, trimethylacetonitrile and benzonitrile, particularly, acetonitrile, benzonitrile or a combination thereof, without limitation.

In the present invention, the equivalent ratio of the catalyst represented by Formula 1 and the nitrile-based additive may be 1:1 to 1:200. Particularly, the nitrile-based additive may be 1 equivalent or more, 3 equivalents or more, and 200 equivalents or less, 100 equivalents or less, 20 equivalents or less, 10 equivalents or less, 5 equivalents or less based on 1 equivalent of the catalyst represented by Formula 1.

If the nitrile-based additive is 1 equivalent or more based on 1 equivalent of the catalyst represented by Formula 1, the effects of carbocation using the nitrile-based additive may be sufficiently shown, polyisobutene showing high number average molecular weight and exo-content may be efficiently prepared, and reproducibility may be improved by suitably controlling catalyst activity. In addition, if the nitrile-based additive is 200 equivalents or less based on 1 equivalent of the catalyst represented by Formula 1, the early finishing phenomenon of polymerization reaction through the combination of the excessive amount of the nitrile-based additive with the carbocation may be prevented.

In the present invention, the catalyst composition may further include a cocatalyst for controlling the physical properties of polyisobutene, and in this case, all cocatalysts applicable for preparing polyisobutene in this technical field may be used without limitation.

Method for Preparing Polyisobutene

The method for preparing polyisobutene of the present invention is characterized in including a step of polymerizing isobutene in the presence of the catalyst composition.

In the present invention, the polymerization of the isobutene may be performed at a temperature of 10 to 50° C., particularly, 10° C. or more, 15° C. or more, 25° C. or more, and 50° C. or less, 40° C. or less, 35° C. or less, for example, at 30° C.

If the polymerization temperature is 0° C. or more, appropriate catalyst active may be achieved, a polymerization conversion ratio may be shown excellent, and a small amount of a catalyst may be used, and if the polymerization temperature is 50° C. or less, chain transfer reaction may be controlled, the molecular weight and exo-content of polyisobutene may be shown high, and polyisobutene with high quality may be produced.

In addition, the polymerization is required to satisfy the above temperature conditions, and at the same time, may be performed for 10 minutes to 3 hours, particularly, 30 minutes or more, 1 hour or more, 1.5 hours or more, and 3 hours or less, 2.5 hours or less, for example, 2 hours.

In the present invention, the polymerization may be performed in the presence of a halogenated hydrocarbon solvent. In addition, the halogenated hydrocarbon solvent may be mixed with a nonpolar hydrocarbon solvent to be used together.

As described above, in order to initiate the cationic polymerization in the present invention, the hydrogen atom present between oxygen atoms of the catalyst represented by Formula 1 is required to react with isobutene to dissociate an ether compound (R—O—R) and produce the carbocation of isobutene, and in order to keep the carbocation thus produced in an ionic state for a long time to improve polymerization reactivity, a halogenated hydrocarbon solvent having polarity may be used.

However, though the halogenated hydrocarbon solvent is advantageous at the initiation point of the polymerization reaction as described above, due to the toxicity of halogen in a dissolved state in the halogenated hydrocarbon solvent, catalyst stability is lowered, and if not used for polymerization immediately after mixing, the activity of the catalyst represented by Formula 1 may gradually decrease according to time.

On the contrary, in case of the catalyst represented by Formula 1 used in the present invention, stability in the halogenated hydrocarbon solvent such as dichloromethane is excellent, and though being used for polymerization after a certain time period from the preparation of a catalyst composition, catalyst activity may be excellent, and polyisobutene with high quality may be prepared with a high polymerization conversion ratio.

The halogenated hydrocarbon solvent may be one or more selected from the group consisting of chloromethane, dichloromethane, trichloromethane, 1-chlorobutane and chlorobenzene, but is not limited thereto.

The nonpolar hydrocarbon solvent may be an aliphatic hydrocarbon solvent or an aromatic hydrocarbon solvent. For example, the aliphatic hydrocarbon solvent may be one or more selected from the group consisting of butane, pentane, neopentane, hexane, cyclohexane, methylcyclohexane, heptane and octane, and the aromatic hydrocarbon solvent may be one or more selected from the group consisting of benzene, toluene, xylene and ethylbenzene, without limitation.

In the present invention, the catalyst represented by Formula 1 may be 5 to 250 wtppm based on the isobutene, particularly, 5 wtppm or more, 7 wtppm or more, 9 wtppm or more, 10 wtppm or more, and 250 wtppm or less, 100 wtppm or less, 50 wtppm or less, 45 wtppm or less based on the isobutene.

If the catalyst represented by Formula 1 is 5 wtppm or more based on the isobutene, the catalyst amount is sufficient in contrast to the isobutene, and the cationic polymerization may be performed smoothly, and thus, a polymerization conversion ratio and the production amount of polyisobutene may be excellent. If the catalyst represented by Formula 1 is 250 wtppm or less based on the isobutene, the oligomerization reaction of the isobutene due to the excessive amount of the catalyst may be restrained, and polyisobutene with a high molecular weight may be prepared.

In the present invention, after the step of polymerizing isobutene, a step of removing the catalyst represented by Formula 1 through filtering the polymerization product may be further performed.

The catalyst represented by Formula 1 used in the present invention may be efficiently removed through a physical step of simple filtering, and the use and removal thereof is even easier than the conventionally used Lewis acid catalyst. In addition, by removing the catalyst through filtering, halogen which may be derived from the catalyst may be removed beforehand, and polyisobutene containing the low halogen content may be obtained from the polymerization product.

The filtering may be performed using a filter including one or more selected from the group consisting of a porous material, for example, silica, celite and zeolite.

Generally, the polyisobutene thus produced is dissolved in an organic solvent such as pentane, cyclopentane, cyclohexane, heptane, octane and diethyl ether, and then washed to remove remaining catalyst. However, in the present invention, the catalyst represented by Formula 1 may be easily removed through filtering, and a separate washing step may not be performed.

In the present invention, a step of drying remaining solvents may be further included after the step of filtering the polymerization product.

The drying temperature may be 30 to 200° C., or 40 to 150° C., a vacuum degree may be 300 torr or less, 200 torr or less, or 100 torr or less. In addition, the drying method is not specifically limited and may be a common method.

In addition, in the method for preparing polyisobutene of the present invention, a step of drying the halogenated hydrocarbon solvent before filtering may be separately performed or not. If the drying step is performed, drying conditions may be the same as described above, without specific limitation.

In case of separately performing the drying step of the halogenated hydrocarbon solvent, polyisobutene with an even higher purity may be obtained. However, according to the present invention, since the catalyst may be easily removed through the simple filtering as described above, the separate drying step of the halogenated hydrocarbon solvent after the polymerization step and before the filtering may be omitted, and there are advantages of simplifying processes.

The polyisobutene prepared according to the present invention shows a high molecular weight and exo-content.

Particularly, the number average molecular weight of the polyisobutene may be 1,000 to 10,000 g/mol, particularly, 1000 g/mol or more, 1,300 g/mol or more, 1,400 g/mol or more, and 10,000 g/mol or less, 7,000 g/mol or less, 5,000 g/mol or less.

In addition, the molecular weight distribution (PDI) of the polyisobutene may be 1.5 to 3.0, particularly, 1.5 to 2.5, 1.5 to 2.0.

In addition, the exo-content (%) determined by an equation below may be 80% or more in the polyisobutene. If the exo-content increases, it means that high reactive polyolefin, for example, high reactive polybutene (HR-PB) is formed.

$$\text{exo-content (\%)} = (\text{mole number of exo-olefin in which carbon-carbon double bond is positioned at terminal})/(\text{mole number of exo-olefin and endo-olefin produced}) \times 100$$

EXAMPLES

Hereinafter, the present invention will be described in more detail referring to embodiments. However, the embodiments below are only illustrations, and the scope of the present invention is not limited thereto.

Preparation of Catalyst

Preparation Example 1

[Formula 1-1]

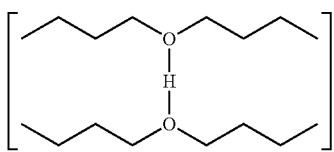

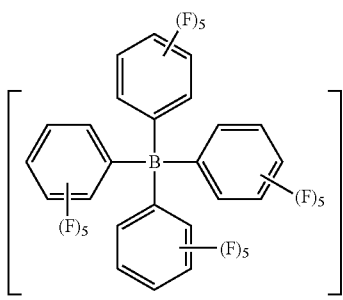

In a glove box, 1 g of [H(Et$_2$O)$_2$][B(C$_6$F$_5$)$_4$] was put in a round flask, and 10 mL of dichloromethane was added. At room temperature, 5 equivalents of anhydrous dibutyl ether (Sigma-Aldrich Co.) was added and stirred for 30 minutes. After stirring, all solvents were removed under vacuum conditions. The white powder thus obtained was washed with anhydrous hexane by 5 mL×three times, and dried again in vacuum conditions to obtain [H(nBu$_2$O)$_2$][B(C$_6$F$_5$)$_4$].

Preparation Example 2

[Formula 1-2]

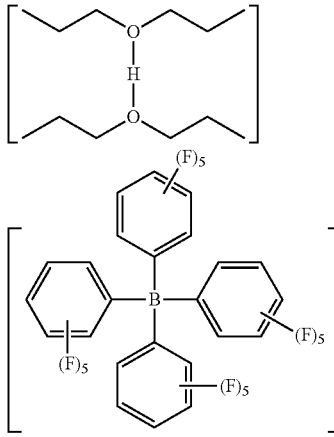

The same method as in Preparation example 1 was performed except for changing anhydrous dibutyl ether into anhydrous dipropyl ether.

Comparative Preparation Example 1

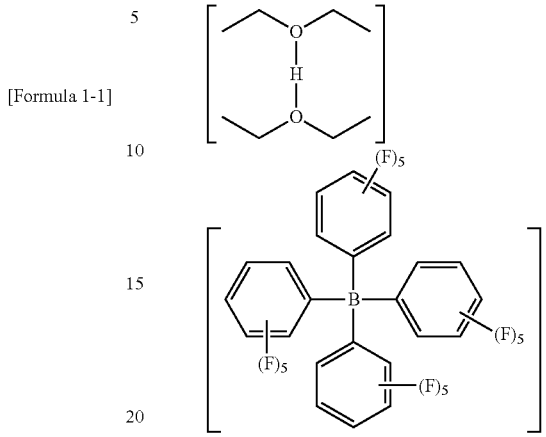

In a glove box under argon conditions, 1 g of [Li(Et$_2$O)$_n$][B(C$_6$F$_5$)$_4$] (TCI Co.) was put in a round flask, and 10 mL of anhydrous diethyl ether was added. The solution thus prepared was taken out of the glove box and then, connected with a Schlenk line, and argon conditions were set. A cooling bath was manufactured using acetonitrile and dry ice, and the solution thus prepared was stirred at −40° C. While stirring the solution, 5 equivalents of 1 M HCl (TCI Co.) in diethyl ether was injected via a syringe to the solution. The solution was stirred further at −40° C. for 30 minutes, and the temperature was slowly elevated to room temperature. The solution of which temperature was elevated to room temperature was taken into the glove box again, salts thus produced were removed through filtering, and transparent solutions were collected and dried in vacuum conditions. After drying all solvents in vacuum, washing with anhydrous hexane was performed by 5 mL×three times, and vacuum drying was performed to obtain [H(Et$_2$O)$_2$][B(C$_6$F$_5$)$_4$].

Comparative Preparation Example 2

The same method as in Preparation Example 1 was performed except for using anhydrous diisopropyl ether instead of anhydrous dibutyl ether.

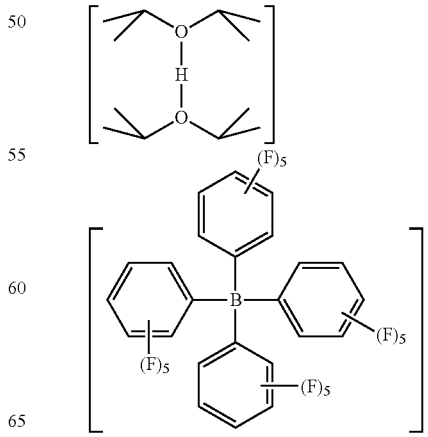

Comparative Preparation Example 3

NaBAr'4 and chlorine were reacted in diethyl ether, and sodium tetrakis[3,5-bis(trifluoromethyl)phenyl]borate was purchased from Sigma-Aldrich Co., and used.

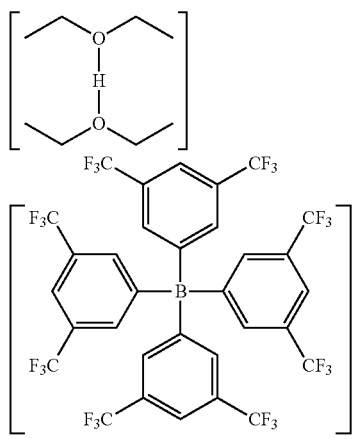

Preparation of Polyisobutene

Example 1

With an Andrew glass flask in a vacuum state, cooled to 10° C. or less, an isobutene line was connected, and 20 g of isobutene was injected thereto. At the same temperature, 80 mL of a toluene solvent was injected using a syringe.

In a glove box, the catalyst of Preparation Example 1 (40 wtppm based on isobutene) and benzonitrile (equivalent ratio of the catalyst of Preparation Example 1 and benzonitrile additive=1:5) were weighed and dissolved in 0.5 mL of DCM to prepare a catalyst composition.

After that, while keeping the Andrew glass flask in a polymerization temperature of 30° C. state, the catalyst composition was injected using a syringe. After performing cationic polymerization of isobutene for 2 hours, a product was dried to obtain polyisobutene.

Examples 2 to 6

By the same method as in Example 1 except for changing polymerization conditions as shown in Table 1 below, polyisobutenes were prepared.

Examples 7 to 9

With an Andrew glass flask in a vacuum state, cooled to 10° C. or less, an isobutene line was connected, and 20 g of isobutene was injected thereto. At the same temperature, 80 mL of a toluene solvent was injected using a syringe.

In a glove box, the catalyst of Preparation Example 1 (40 wtppm based on isobutene) and benzonitrile (equivalent ratio of the catalyst of Preparation Example 1 and benzonitrile additive=1:5) were weighed and dissolved in 0.5 mL of DCM to prepare a catalyst composition. Then, the catalyst composition was stored at room temperature for each aging time according to Table 1.

After that, while keeping the Andrew glass flask in a polymerization temperature of 30° C. state, the catalyst composition was injected using a syringe. After performing cationic polymerization of isobutene for 2 hours, a product was dried to obtain polyisobutene.

Comparative Examples 1 to 11

Polyisobutenes were prepared by the same method as in Example 1 except for changing polymerization conditions as shown in Table 1 below.

TABLE 1

| | Catalyst | | Additive | | Polymerization temperature | Aging |
|---|---|---|---|---|---|---|
| | Type | wtppm | Type | Equivalent | ° C. | time |
| Example 1 | Preparation Example 1 | 40 | Benzonitrile | 5 | 30 | 0 |
| Example 2 | Preparation Example 1 | 30 | Benzonitrile | 5 | 30 | 0 |
| Example 3 | Preparation Example 1 | 20 | Benzonitrile | 5 | 30 | 0 |
| Example 4 | Preparation Example 1 | 10 | Benzonitrile | 5 | 30 | 0 |
| Example 5 | Preparation Example 1 | 20 | Acetonitrile | 5 | 30 | 0 |
| Example 6 | Preparation Example 2 | 40 | Acetonitrile | 5 | 30 | 0 |
| Example 7 | Preparation Example 1 | 40 | Benzonitrile | 5 | 30 | 5 |
| Example 8 | Preparation Example 1 | 40 | Benzonitrile | 5 | 30 | 12 |
| Example 9 | Preparation Example 1 | 40 | Benzonitrile | 5 | 30 | 24 |
| Comparative Example 1 | Comparative Preparation Example 1 | 40 | Benzonitrile | 5 | 30 | 0 |
| Comparative Example 2 | Comparative Preparation Example 2 | 20 | Benzonitrile | 5 | 30 | 0 |

TABLE 1-continued

|  | Catalyst | | Additive | | Polymerization temperature ° C. | Aging time |
|---|---|---|---|---|---|---|
|  | Type | wtppm | Type | Equivalent | | |
| Comparative Example 3 | Comparative Preparation Example 3 | 10 | Benzonitrile | 5 | 30 | 0 |
| Comparative Example 4 | Preparation Example 1 | 20 | Triethylamine | 5 | 30 | 0 |
| Comparative Example 5 | Preparation Example 1 | 20 | Ether-based compound | 5 | 30 | 0 |
| Comparative Example 6 | Preparation Example 1 | 20 | Sulfide-based compound | 5 | 30 | 0 |
| Comparative Example 7 | Preparation Example 1 | 20 | Phosphine-based compound | 5 | 30 | 0 |
| Comparative Example 8 | Preparation Example 2 | 20 | — | — | 30 | 0 |
| Comparative Example 9 | Comparative Preparation Example 3 | 10 | Benzonitrile | 5 | 30 | 5 |
| Comparative Example 10 | Comparative Preparation Example 3 | 10 | Benzonitrile | 5 | 30 | 12 |
| Comparative Example 11 | Comparative Preparation Example 3 | 10 | Benzonitrile | 5 | 30 | 24 |

Experimental Example 1

With respect to the polyisobutenes obtained in the Examples and Comparative Examples, physical properties were measured by the methods below.
(1) Polymerization Conversion Ratio (%)
The weight of dried polyisobutene was measured and the conversion ratio was calculated.
(2) Exo-Content (%)
$^1$H NMR was measured using Varian 500 MHz NMR, and an exo-olefin and endo-olefin shape were confirmed according to the position of a double bond, and the exo-content (%) was calculated according to an equation below.

exo-content (%)=(mole number of exo-olefin in which carbon-carbon double bond is positioned at terminal)/(mole number of exo-olefin and endo-olefin produced)×100

(3) Weight Average Molecular Weight (Mw) and Molecular Weight Distribution (MWD)
Polyisobutene was analyzed by gel permeation chromatography under conditions below, a number average molecular weight (Mn) and a weight average molecular weight (Mw) were measured, and molecular weight distribution (Mn) was calculated from Mw/Mn.
  Column: PL MiniMixed B×2
  Solvent: THF
  Flow rate: 0.3 mL/min
  Specimen concentration: 2.0 mg/mL
  Injection amount: 10 μl
  Column temperature: 40° C.
  Detector: Agilent RI detector
  Standard: polystyrene (corrected by a cubic function)
  Data processing: ChemStation

TABLE 2

|  | Polymerization conversion ratio (%) | exo-content (%) | Mn (g/mol) | MWD |
|---|---|---|---|---|
| Example 1 | 94 | 90 | 1,530 | 1.9 |
| Example 2 | 93 | 89 | 1,920 | 1.8 |
| Example 3 | 92 | 91 | 2,070 | 1.8 |
| Example 4 | 91 | 92 | 2,610 | 1.9 |
| Example 5 | 95 | 91 | 2,800 | 1.5 |
| Example 6 | 98 | 81 | 1,420 | 2.0 |
| Comparative Example 1 | 96 | 53 | 780 | 2.7 |
| Comparative Example 2 | 90 | 65 | 920 | 2.3 |
| Comparative Example 3 | 97 | 73 | 1,220 | 2.0 |
| Comparative Example 4 | No reactivity | — | — | — |
| Comparative Example 5 | 78 | 81 | 1,300 | 2.2 |
| Comparative Example 6 | No reactivity | — | — | — |
| Comparative Example 7 | No reactivity | — | — | — |
| Comparative Example 8 | 90 | 65 | 920 | 2.5 |

All the polyisobutenes of the Examples were prepared using a catalyst composition including a catalyst represented by Formula 1 and a nitrile-based additive according to the present invention. Particularly, in the Examples, high reactive polyisobutenes having a number average molecular weight of 1,000 g/mol or more and the exo-content of 90% or more were prepared, and polymerization conversion ratios were all excellent.

Meanwhile, in case of Comparative Examples 1 to 3, in which catalysts not corresponding to Formula 1 were used, and Comparative Example 8 in which an additive was not used in the catalyst composition, polyisobutenes having a small number average molecular weight and wide molecular weight distribution were prepared, and in case of Comparative Examples 4 to 7, in which compounds other than nitrile were used as additives, polymerization reaction was not properly performed, and polyisobutene was not obtained.

Experimental Example 2

Examples and Comparative Examples, with the same reaction conditions and only different aging time, were correspondingly compared. Methods and conditions for measuring the physical properties of polyisobutenes were the same as in Experimental Example 1.

TABLE 3

|  | Polymerization conversion ratio | exo-content (%) | Mn | MWD |
|---|---|---|---|---|
| Example 1 | 94 | 90 | 1,530 | 1.9 |
| Example 7 | 93 | 91 | 1,510 | 1.9 |
| Example 8 | 92 | 91 | 1,566 | 1.8 |
| Example 9 | 94 | 90 | 1,500 | 1.9 |
| Comparative Example 3 | 97 | 73 | 1,220 | 2.0 |
| Comparative Example 9 | 82 | 86 | 3,060 | 2.3 |
| Comparative Example 10 | 45 | 90 | 4,953 | 2.4 |
| Comparative Example 11 | 20 | 92 | 5,730 | 2.3 |

As shown in Table 3 above, the catalyst composition according to the present invention may keep a stable state for a long time, and in Examples 7 to 9, in which the catalyst compositions were used after storing for a certain time at room temperature after preparation, polyisobutenes showing similar degrees of high number average molecular weight and exo-content could be prepared. On the contrary, when comparing Comparative Example 3, and Comparative Examples 9 to 11, in which Comparative Preparation Example 3 was used as a catalyst, the polymerization conversion ratio was rapidly reduced with the increase of storing time at room temperature. Through this, it was confirmed that the catalyst compositions used in the Comparative Examples have inferior stability at room temperature, and catalyst activity was gradually reduced.

Experimental Example 3

After polymerizing polyisobutenes according to Examples 1, 2 and 4, and Comparative Example 4, the polymerized solutions were passed through a column filled with celite, silica, zeolite or glass fiber as shown in Table 4 below.

With respect to Examples 1, 2 and 4, and Comparative Example 4, the resultant products after filtering by passing through the column above and polymerization solutions not undergoing filtering were analyzed according to the methods below, and the results are shown in table 4.

(1) F Content (wtppm)

Measurement was performed using Combustion IC (ICS-2100/AQF-5000, Thermo Scientific Dionex) under the conditions below.

- Column: IonPac AS18 analytical (4×250 mm), IonPac AG18 guard (4×50 mm)
- Eluent type: KOH (30.5 mM)
- Eluent flow rate: 1 mL/min
- Detector: Suppressed Conductivity Detector
- SRS Current: 76 mA
- Injection Volume: 20 μl
- Isocratic/Gradient conditions: Isocratic

TABLE 4

|  | Filtering method | F element analysis results (mg/kg) |
|---|---|---|
| Example 1 | — | 48 |
|  | Celite | <10 |
|  | Silica | <10 |
|  | Zeolite | <10 |
|  | Glass fiber | 49 |
| Example 2 | — | 35 |
|  | Celite | <10 |
|  | Silica | <10 |
|  | Zeolite | <10 |
|  | Glass fiber | 38 |
| Example 4 | — | 25 |
|  | Celite | <10 |
|  | Silica | <10 |
|  | Zeolite | <10 |
|  | Glass fiber | 24 |
| Comparative Example 4 | — | 47 |
|  | Celite | 47 |
|  | Silica | 47 |
|  | Zeolite | 47 |
|  | Glass fiber | 47 |

With respect to Examples 1, 2 and 4, it could be confirmed that if the filtering was performed using columns including celite, silica and zeolite, a small amount of F element was detected when comparing before performing filtering, and the catalyst was removed well. On the contrary, with respect to Comparative Example 4, the catalyst was rarely removed though performing the filtering. Meanwhile, if a column including glass fiber was used, almost the same degree of F element was detected when comparing with a case not performing the filtering, and it could be confirmed that the glass fiber was inappropriate.

As described above, it could be found that if the catalyst composition according to the present invention is used, the catalyst remaining in polyisobutene may be easily removed through a simple method of filtering a polymerization product.

The invention claimed is:

1. A catalyst composition comprising: a catalyst represented by the following Formula 1; and a nitrile-based additive:

[Formula 1]

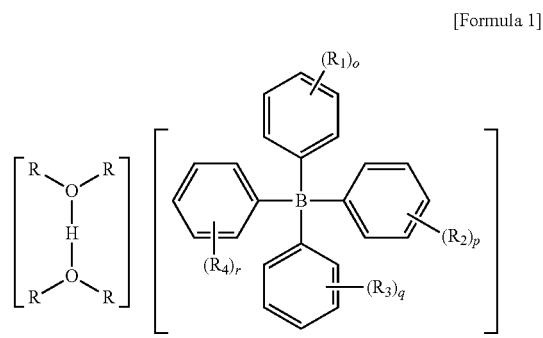

in Formula 1,

R is a linear C3 alkyl group, or a linear or branched C4-C12 alkyl group, $R_1$ to $R_4$ are each independently hydrogen, a halogen group or a halogen-substituted alkyl group of 1 to 20 carbon atoms, and o, p, q and r are each independently an integer of 1 to 5.

2. The catalyst composition according to claim 1, wherein the catalyst represented by Formula 1 and the nitrile-based additive are included in an equivalent ratio of 1:1 to 1:200.

3. The catalyst composition according to claim 1, wherein, in Formula 1,
R is a linear C3 alkyl group, or a linear or branched C4-C8 alkyl group,
$R_1$ to $R_4$ are each independently a halogen group, and
o, p, q and r are each independently an integer of 3 to 5.

4. The catalyst composition according to claim 1, wherein, in Formula 1,
R is an n-propyl group or a butyl group,
$R_1$ to $R_4$ are each independently F or Cl, and
o, p, q and r are each independently an integer of 4 or 5.

5. The catalyst composition according to claim 1, wherein the nitrile-based additive is a compound represented by the following Formula 2:

[Formula 2]

$R_5$—CN in Formula 2,
R5 is an alkyl group of 1 to 20 carbon atoms or an aryl group of 6 to 30 carbon atoms.

6. The catalyst composition according to claim 1, wherein the nitrile-based additive is one or more selected from the group consisting of acetonitrile, propionitrile, 2-methylpropanenitrile, trimethylacetonitrile and benzonitrile.

7. A method for preparing polyisobutene, comprising a step of polymerizing isobutene in the presence of the catalyst composition according to claim 1.

8. The method for preparing polyisobutene according to claim 7, wherein the polymerization is performed at a temperature of 10 to 50° C.

9. The method for preparing polyisobutene according to claim 7, wherein the polymerization is performed in the presence of a halogenated hydrocarbon solvent.

10. The method for preparing polyisobutene according to claim 7, wherein the catalyst represented by Formula 1 is 5 to 250 wtppm based on the isobutene.

11. The method for preparing polyisobutene according to claim 7, wherein the polyisobutene has a number average molecular weight of 1,000 to 10,000 g/mol.

12. The method for preparing polyisobutene according to claim 7, wherein the polyisobutene has a molecular weight distribution of 1.5 to 3.0.

13. The method for preparing polyisobutene according to claim 7, further comprising a step of removing the catalyst represented by Formula 1 by filtering a polymerization product after the step of polymerizing isobutene.

14. The method for preparing polyisobutene according to claim 13, wherein the filtering is performed using a filter comprising one or more selected from the group consisting of silica, celite and zeolite.

15. The method for preparing polyisobutene according to claim 9, wherein the halogenated hydrocarbon solvent is one or more selected from the group consisting of chloromethane, dichloromethane, trichloromethane, 1-chlorobutane and chlorobenzene.

16. The method for preparing polyisobutene according to claim 7, wherein the polyisobutene has an exo-content (%) determined by an equation below of 80% or more:

exo-content (%)=(mole number of exo-olefin)/(mole number of exo-olefin and endo-olefin produced)×100, wherein the exo-olefin has carbon-carbon double bond that is positioned at terminal, and the endo-olefin has carbon-carbon double bond that is not positioned at terminal.

\* \* \* \* \*